June 15, 1937.  E. S. BISSELL  2,083,820
MICROSCOPE FILTER SYSTEM
Filed March 27, 1935

EVERETT S. BISSELL
INVENTOR

BY
ATTORNEY

Patented June 15, 1937

2,083,820

UNITED STATES PATENT OFFICE 2,083,820

MICROSCOPE FILTER SYSTEM

Everett S. Bissell, Irondequoit, N. Y., assignor to Bausch & Lomb Optical Company, Rochester, N. Y., a corporation of New York Application March 27, 1935, Serial No. 13,312

3 Claims. (Cl. 88—40)

The present invention relates to miscroscope filters and more particularly to color filters for so-called "optical staining".

In the microscopic examination of some substances such as nearly transparent organisms, it is frequently necessary to stain the specimens with some form of dye before they can be readily seen and studied. This presents a disadvantage in that the dye frequently kills or injures the organism. The Rheinberg filter was designed to overcome this difficulty by optically staining the specimens. The Rheinberg filter is one using both bright and dark field illumination where the two illuminating beams are of contrasting colors so that the organism stands out against a field of contrasting color.

One of the objects of the present invention is to provide a new and improved form of microscope filter which is simple and inexpensive to manufacture yet efficient in operation. A further object is to provide a filter for optically staining specimens and which can be substituted for the conventional dark ground stop. These and other objects and advantages reside in certain novel features of construction, arrangement and combination of parts as will hereinafter be more fully set forth and pointed out in the appended claims.

Referring to the drawing.

Figure 1:
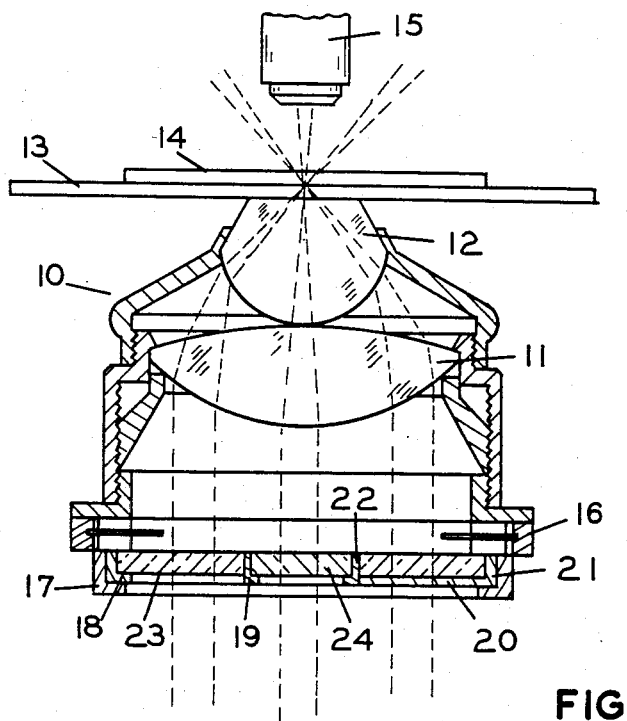
Fig. 1 is a vertical section of a microscope condensing system showing an embodiment of my invention.
Figure 2:
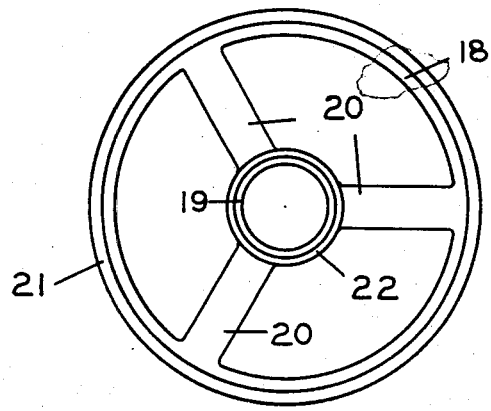
Fig. 2 is a top plan view of the filter holder.

A preferred embodiment of my invention is illustrated in the drawing wherein 10 indicates generally a microscope condenser mount holding lenses 11 and 12 for directing light through the slide 13 and cover glass 14 to the objective 15. Beneath the lens 11 the condenser mount 10 carries the usual diaphragm 16 and also the usual support 17 for a filter or dark field stop.

The filter support made according to the present invention comprises a large annular member 18 and a smaller annular member 19 held in substantially concentric relation to the large annular member 18 by arms 20. A flange 21 is formed on the outer edge of the member 18 and a flange 22 is formed on the outer edge of the member 19 thus forming two shallow concentric cups. This support can be readily and inexpensively stamped from a single piece of metal.

An annular color filter 23 is placed in the space between the flanges 21 and 22 and a small circular filter 24, usually of contrasting color, is placed within the flange 22. As can be seen from Fig. 1, the light passing through the filter 23 strikes the specimen at too great an angle to enter the objective 15 while that passing through the filter 24 enters the objective 15 directly. In this way the specimen is illuminated by a colored beam which does not directly enter the condenser and appears against a field of contrasting color. The filter elements 23 and 24 can be of celluloid, glass or other suitable substance.

From the foregoing it is apparent that I am able to attain the objects of my invention and provide a new and improved microscope filter which is simple and inexpensive to manufacture yet efficient in operation. The filter support would be supplied with a variety of annular filter elements 23 and a variety of filter elements 24 so that the colors can be changed at will and different combinations could be used to provide any desired contrast. An opaque stop can obviously be substituted for the filter element 24. Various modifications can, of course, be made without departing from the spirit of my invention.

I claim:

1. A rigid filter support comprising two shallow annular members of different size, and an arm for holding said members in substantially concentric relation, an annular filter adapted to rest on said arm and to extend between said members and a second filter adapted to lie within and rest upon the inner member.

2. A microscope filter for optically staining specimens comprising an annular member, an inwardly extending arm secured to said member, a second annular member carried by said arm substantially concentric with said first member, an upturned flange on the outer edge of said second member, an annular filter adapted to surround said flange and a second filter adapted to lie within said flange.

3. A microscope filter for optically staining specimens comprising an annular member having an upturned flange on its outer edge, an inwardly extending arm secured to said member, a second annular member substantially concentric with said first member secured to said arm, said second annular member having an upturned flange on its outer edge, an annular color filter between said two flanges and a second color filter within the flange of said second annular member.

EVERETT S. BISSELL.